(12) United States Patent
Chang

(10) Patent No.: US 6,662,085 B2
(45) Date of Patent: Dec. 9, 2003

(54) REMOTE-CONTROLLED STARTER APPARATUS WITH STARTING DETECTION CAPABILITY

(75) Inventor: Apin Chang, Chung-Ho (TW)

(73) Assignee: Wintecronics Co., Ltd., Taipei Hsien (TW)

( * ) Notice: Subject to any disclaimer, the term of this patent is extended or adjusted under 35 U.S.C. 154(b) by 3 days.

(21) Appl. No.: 10/058,678

(22) Filed: Jan. 29, 2002

(65) Prior Publication Data

US 2003/0093192 A1 May 15, 2003

(30) Foreign Application Priority Data

Nov. 15, 2001 (TW) .................... 90219711 U

(51) Int. Cl.[7] .................... B60K 41/06; F02N 11/08; G08C 19/00
(52) U.S. Cl. .................... 701/2; 701/113; 341/176
(58) Field of Search .................... 701/2, 113; 307/10.1, 307/10.6, 10.3, 10.4; 341/176; 324/173, 207.2; 123/179.1, 179.2, 179.3, 179.4; 290/38 C, 38 E, 38 R

(56) References Cited

U.S. PATENT DOCUMENTS

| | | | | |
|---|---|---|---|---|
| 4,236,594 A | * | 12/1980 | Ramsperger | 180/167 |
| 4,817,466 A | * | 4/1989 | Kawamura et al. | 74/858 |
| 5,024,186 A | * | 6/1991 | Long et al. | 123/179 B |
| 5,601,058 A | * | 2/1997 | Dyches et al. | 123/179.2 |
| 5,617,819 A | * | 4/1997 | Dery et al. | 123/179.2 |
| 5,942,988 A | * | 8/1999 | Snyder et al. | 340/825.69 |
| 6,005,760 A | * | 12/1999 | Holce et al. | 361/93 |
| 6,075,459 A | * | 6/2000 | Saarem et al. | 340/825.69 |

* cited by examiner

Primary Examiner—Tan Q. Nguyen
Assistant Examiner—Dalena Tran
(74) Attorney, Agent, or Firm—Pitney, Hardin, Kipp & Szuch LLP

(57) ABSTRACT

A remote-controlled starter apparatus is used in a machine having a power supply system and a power mechanism interconnected via a power conducting line. The starter apparatus includes a starter control circuit, a current sensing circuit and a signal converting circuit. The starter control circuit starts the power mechanism upon receiving a start-initiate signal transmitted by a remote controller, and generates a signal to activate the current sensing circuit. The current sensing circuit generates a sensor output corresponding to electrical current flowing through the power conducting line. The signal converting circuit is connected to the current sensing circuit and the starter control circuit, and converts the sensor output into a corresponding voltage output to enable the starter control circuit to determine whether or not the starting operation was successful, and to restart the power mechanism upon determining that the starting operation was unsuccessful.

10 Claims, 1 Drawing Sheet

REMOTE-CONTROLLED STARTER APPARATUS WITH STARTING DETECTION CAPABILITY

CROSS-REFERENCE TO RELATED APPLICATION

This application claims priority of Taiwanese Application No. 90219711, filed on Nov. 15, 2001.

BACKGROUND OF THE INVENTION

1. Field of the Invention

The invention relates to a starter apparatus for machines, more particularly to a remote-controlled starter apparatus with a starting detection capability.

2. Description of the Related Art

It is known in the art to start a vehicle by remote control. It is also known in the art to equip a remote-controlled starter apparatus of the vehicle with a starting detection capability in order to permit restarting of the vehicle in case a preceding starting operation was unsuccessful.

Currently, there are two conventional methods available for detecting the success of a starting operation:

The first method involves detection of alternating current noise that is generated when the vehicle is started. In the first method, a conductor is installed for sensing the alternating current noise that is generated when an engine of the vehicle is starter. The alternating current noise is amplified for detection in order to determine whether or not the starting operation was successful. Some of the drawbacks of the first method are as follows: If the starting operation was unsuccessful, and if a nearby large-sized electric machine or another vehicle is started, the conductor will sense the alternating current noise generated by the nearby machine or vehicle, thereby resulting in erroneous detection. In order to avoid the aforesaid drawback, a narrower range for the alternating current noise is taken into account when determining whether or not the starting operation was successful. This introduces another problem: Because of the narrower range, it is possible that the alternating current noise generated when the vehicle engine is successfully started will not fall within this range, thereby resulting in erroneous determination that the starting operation was unsuccessful.

The second method involves detection of the engine speed. Pulse signals are generated according to the engine speed, i.e. no pulse signals are generated when the engine is idle. In the second method, the frequency of the pulse signals is detected a certain period after the engine is supposed to be started to determine whether or not the starting operation was successful. Although the second method is devoid of the drawbacks associated with the first method, it requires modification of the RPM meter of the vehicle. The installation process is not only troublesome but can also arise in damage to nearby vehicle parts.

SUMMARY OF THE INVENTION

Therefore, the object of the present invention is to provide an accurate and easy-to-install remote-controlled starter apparatus capable of overcoming the aforesaid drawbacks of the prior art.

Accordingly, the remote-controlled starter apparatus of this invention is adapted for use in a machine having a power supply system and a power mechanism connected to the power supply system via a power conducting line. The starter apparatus permits remote control of starting operation of the power mechanism, and comprises a starter control circuit, a current sensing circuit, and a signal converting circuit.

The starter control circuit is adapted to receive a start-initiate signal transmitted wirelessly by a remote controller, and is adapted to be connected to and to start the power mechanism upon receipt of the start-initiate signal. The starter control circuit further generates a sensor enable signal upon receipt of the start-initiate signal.

The current sensing circuit is connected to the starter control circuit and is adapted to be coupled to the power conducting line. The current sensing circuit is enabled by the sensor enable signal so as to generate a sensor output corresponding to magnitude of electrical current flowing through the power conducting line. The signal converting circuit is connected to the current sensing circuit and the starter control circuit, and converts the sensor output into a corresponding voltage output that is provided to the starter control circuit.

The starter control circuit determines whether or not the starting operation was successful in accordance with the voltage output received from the signal converting circuit, and is adapted to restart the power mechanism upon determining that the starting operation was unsuccessful.

BRIEF DESCRIPTION OF THE DRAWING

Other features and advantages of the present invention will become apparent in the following detailed description of the preferred embodiment with reference to the accompanying drawing, of which.

DETAILED DESCRIPTION OF THE PREFERRED EMBODIMENT

Figure 1:
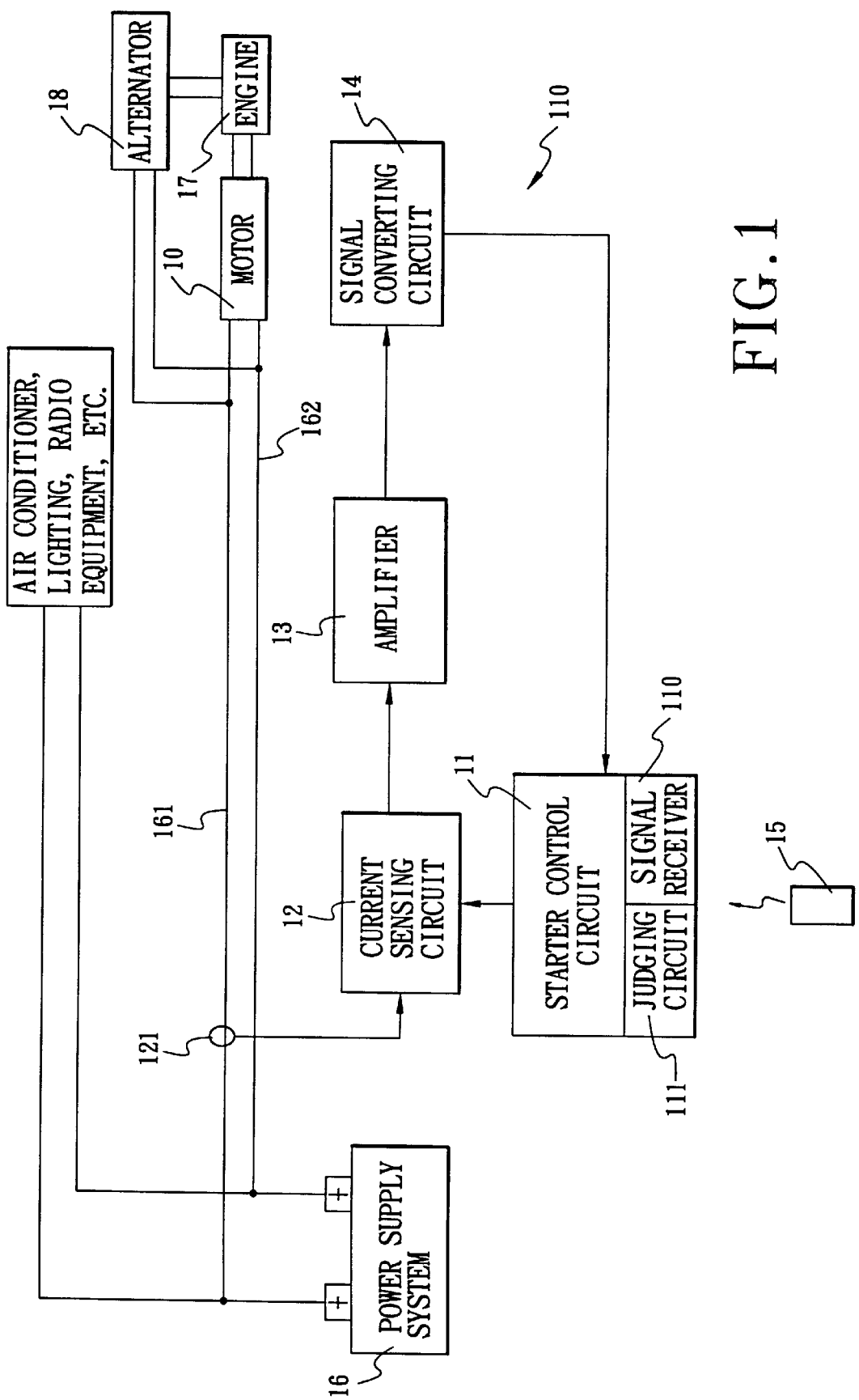
FIG. 1 is a schematic circuit block diagram illustrating the preferred embodiment of a remote-controlled starter apparatus for a vehicle in accordance with this invention.

Referring to FIG. 1, the preferred embodiment of a remote-controlled starter apparatus 1 according to this invention is shown to be adapted for use in a vehicle having a power supply system 16 for vehicle components, such as an air conditioner, lighting, radio equipment, etc., and a power mechanism connected to the power supply system 16 via positive and negative power conducting lines 161, 162. The power mechanism includes an engine 17, a motor 10 for starting the engine 17, and an alternator 18 connected to the engine 17 and the power conducting lines 161, 162. The starter apparatus 1 permits remote control of the starting operation of the power mechanism, and comprises a starter control circuit 11, a current sensing circuit 12, an amplifier 13, and a signal converting circuit 14.

The starter control circuit 11 is adapted to receive a start-initiate signal transmitted wirelessly by a remote controller 15, and is adapted to be connected to and to activate the motor 10 in a known manner for starting the engine 17 upon receipt of the start-initiate signal. The starter control circuit 11 further generates a sensor enable signal upon receipt of the start-initiate signal. In this embodiment, the starter control circuit 11 includes a signal receiver 110 and a judging circuit 111.

In use, the starter control circuit 11 remains idle prior to starting of the power mechanism by remote control. When the signal receiver 110 receives the start-initiate signal, the starter control circuit 11 will simulate the operation of an ignition key for starting the engine 17. First, the power supply system 16 is turned on such that a pre-starting current will be present in the power conducting lines 161, 162. Then, the motor 10 is activated to start the engine 17. A starting current greater than the pre-starting current is present in the power conducting lines 161, 162 at this time. After starting the engine 17, a post-starting current will be present in the power conducting lines 161, 162. If the engine 17 was successfully started, the motor 10 will cease to be activated, and the alternator 18 will be driven by the engine 17 to charge the power supply system 16. The post-starting current present in the power conducting lines 161, 162 at this time will be greater than the pre-starting current but less than the starting current. On the other hand, if starting of the engine 17 was unsuccessful, the magnitude of the post-starting current will be equal to that of the pre-starting current.

The current sensing circuit 12 is connected to the starter control circuit 11, and includes a Hall sensor 121 adapted to be sleeved on the positive power conducting line 161. The current sensing circuit 12 is enabled by the sensor enable signal from the starter control circuit 11 so as to generate a sensor output corresponding to the magnitude of electrical current flowing through the power conducting line 161. The sensor output is one of pre-starting, starting and post-starting sensor outputs corresponding to the electrical current present in the power conducting line 161 before, during and after the starting operation of the engine 17, respectively.

The amplifier 13 is connected to the current sensing circuit 12 and is used to amplify the sensor output.

The signal converting circuit 14 is connected to the amplifier 13 and the starter control circuit 11. The signal converting circuit 14 converts the amplified sensor output from the amplifier 13 into a corresponding voltage output that is provided to the starter control circuit 11. Particularly, the signal converting circuit 14 generates first, second and third voltage outputs corresponding to the pre-starting, starting and post-starting sensor outputs, respectively.

The judging circuit 111 of the starter control circuit 11 determines whether or not the starting operation was successful in accordance with the first, second and third voltage outputs received from the signal converting circuit 14. Particularly, the judging circuit 111 determines the starting operation to be successful when the third voltage output is found to be greater than the first voltage output but less than the second voltage output. Under such a condition, the starter control circuit 11 will cease to activate the motor 10. On the other hand, the judging circuit 111 determines the starting operation to be unsuccessful when the third voltage output is found to be equal to the first voltage output. At this time, the starter control circuit 11 will be enabled to repeat the starting operation for starting the engine 17. In the preferred embodiment, the starter control circuit 11 ceases to activate the motor 10 and to restart the engine 17 upon determining that the starting operation was unsuccessful for a predetermined number of times, preferably two times.

Only two steps are required to install the starter apparatus 1 of this invention in a vehicle. First, the starter apparatus 1 is mounted on an appropriate location, such as in the vicinity of the motor 10. Then, the current sensor 121 is sleeved on the power conducting line 161. The installation process is easy and convenient to conduct, and does not require dismantling of other vehicle parts.

From the foregoing, it can be appreciated that the remote-controlled starter apparatus 1 of this invention merely uses a current sensor 121 of the current sensing circuit 12 sleeved on the power conducting line 161 to sense the pre-starting, starting and post-starting currents so that a determination as to whether or not the starting operation was successful can be made. Not only is the circuit layout simple, the judging accuracy rendered is also rather high and is not affected by nearby electrical machines.

It should be noted that the use of the remote-controlled starter apparatus 1 of this invention should not be limited only to vehicles. The starter apparatus 1 can also be applied to any machine that can be started by remote control and that requires detection of the starting result.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A remote-controlled starter apparatus adapted for use in a machine having a power supply system and a power mechanism connected to the power supply system via a power conducting line, said starter apparatus permitting remote control of starting operation of the power mechanism and comprising:

a starter control circuit adapted to receive a start-initiate signal transmitted wirelessly by a remote controller, and adapted to be connected to and to start the power mechanism upon receipt of the start-initiate signal, said starter control circuit further generating a sensor enable signal upon receipt of the start-initiate signal;

a current sensing circuit connected to said starter control circuit and adapted to be coupled to the power conducting line, said current sensing circuit being enabled by the sensor enable signal so as to generate a sensor output corresponding to magnitude of electrical current flowing through the power conducting line; and a signal converting circuit connected to said current sensing circuit and said starter control circuit, said signal converting circuit converting the sensor output into a corresponding voltage output that is provided to said starter control circuit;

said starter control circuit determining whether or not the starting operation was successful in accordance with the voltage output received from said signal converting circuit, and being adapted to restart the power mechanism upon determining that the starting operation was unsuccessful, wherein the sensor output from said current sensing circuit includes pre-starting, starting and post-starting sensor outputs corresponding to the electrical current present in the power conducting line before, during and after the starting operation of the power mechanism, respectively;

wherein said signal converting circuit generates first, second and third voltage outputs corresponding to the pre-starting, starting and post-starting sensor outputs, respectively;

wherein said starter control circuit includes a signal receiver adapted to receive the start-initiate signal, and a judging circuit for determining whether or not the starting operation was successful in accordance with the first, second and third voltage outputs from said signal converting circuit; and wherein said judging circuit determines the starting operation to be successful when the third voltage output is found to be greater than the first voltage output but less than the second voltage output.

2. The remote-controlled starter apparatus as claimed in claim 1, wherein said current sensing circuit includes a Hall sensor adapted to be sleeved on the power conducting line.

3. The remote-controlled starter apparatus as claimed in claim 1, further comprising an amplifier connected to said current sensing circuit and said signal converting circuit for amplifying the sensor output prior to receipt thereof by said signal converting circuit.

4. The remote-controlled starter apparatus as claimed in claim 1, wherein said judging circuit determines the starting operation to be unsuccessful when the third voltage output is found to be equal to the first voltage output.

5. The remote-controlled starter apparatus as claimed in claim 1, wherein said starter control circuit ceases to restart the power mechanism upon determining that the starting operation was unsuccessful for a predetermined number of times.

6. A remote-controlled starter apparatus adapted for use in a vehicle having a power supply system and a power mechanism connected to the power supply system via a power conducting line, the power mechanism including an engine and a motor for starting the engine, said starter apparatus permitting remote control of starting operation of the power mechanism and comprising:

a starter control circuit adapted to receive a start-initiate signal transmitted wirelessly by a remote controller, and adapted to be connected to and to activate the motor for starting the engine upon receipt of the start-initiate signal, said starter control circuit further generating a sensor enable signal upon receipt of the start-initiate signal;

a current sensing circuit connected to said starter control circuit and adapted to be coupled to the power conducting line, said current sensing circuit being enabled by the sensor enable signal so as to generate a sensor output corresponding to magnitude of electrical current flowing through the power conducting line; and a signal converting circuit connected to said current sensing circuit and said starter control circuit, said signal converting circuit converting the sensor output into a corresponding voltage output that is provided to said starter control circuit;

said starter control circuit determining whether or not the starting operation was successful in accordance with the voltage output received from said signal converting circuit, and being adapted to restart the power mechanism upon determining that the starting operation was unsuccessful, wherein the sensor output from said current sensing circuit includes pre-starting, starting and post-starting sensor outputs corresponding to the electrical current present in the power conducting line before, during and after the starting operation of the power mechanism, respectively;

wherein said signal converting circuit generates first, second and third voltage outputs corresponding to the pre-starting, starting and post-starting sensor outputs, respectively;

wherein said starter control circuit includes a signal receiver adapted to receive the start-initiate signal, and a judging circuit for determining whether or not the starting operation was successful in accordance with the first, second and third voltage outputs from said signal converting circuit; and wherein said judging circuit determines the starting operation to be successful when the third voltage output is found to be greater than the first voltage output but less than the second voltage output.

7. The remote-controlled starter apparatus as claimed in claim 6, wherein said current sensing circuit includes a Hall sensor adapted to be sleeved on the power conducting line.

8. The remote-controlled starter apparatus as claimed in claim 6, further comprising an amplifier connected to said current sensing circuit and said signal converting circuit for amplifying the sensor output prior to receipt thereof by said signal converting circuit.

9. The remote-controlled starter apparatus as claimed in claim 6, wherein said judging circuit determines the starting operation to be unsuccessful when the third voltage output is found to be equal to the first voltage output.

10. The remote-controlled starter apparatus as claimed in claim 6, wherein said starter control circuit ceases to activate the motor upon determining that the starting operation was unsuccessful for a predetermined number of times.

* * * * *